Patented May 17, 1949

2,470,281

UNITED STATES PATENT OFFICE 2,470,281

PRESERVATIVE COATINGS FOR FOODS

Wilber J. Allingham, Denver, Colo.

No Drawing. Application March 29, 1946,
Serial No. 658,235

3 Claims. (Cl. 99—169)

This invention relates to a preservative coating compound for food products and has for its principal object the provision of a liquid which can be used to coat meats, fruit, vegetables, and other food products, and which will prevent oxidation and dehydration of the food.

The improved surface coating compound is more particularly designed for use on products before "deep freezing." Many products, such as meat, are damaged by freezing, due to oxidation of the surface layers and to dehydration thereof, caused by the lowering of the temperature in the freezing chamber.

The present coating compound is designed to prevent, or a least greatly retard, this deleterious oxidation and dehydration encountered in freezing foods.

Another object of the invention is to provide a compound for this purpose which will be invisible, tasteless, odorless, and harmless, and which will enhance the food value of the treated food.

The improved surface coating compound consists principally of lecithin. Lecithin itself, however, due to its thick, sticky, viscous characteristics, would be impossible to use as a coating compound. It has been found, however, that lecithin may be dissolved in a dry powdered gel from a carbohydrate, and more particularly "gellose," obtained from the well-known Irish moss harvested from the submarine beds along the Atlantic sea coast.

The gel-forming carbohyrate from Irish moss is also known by other trade names, such as "carrageen," "carragar," or "krim-ko-gel." For the purpose of description herein, however, this product will be designated "Irish moss gel."

Other vegetable gels such as "agar-agar" do not appear to be as satisfactory as the Irish moss gel, possibly due to the fact that the latter has a relatively high content of sea water mineral matters which may be at least partially responsible for its effectiveness as a colloidal dispersing agent for the lecithin. Experiments indicate that the Irish moss gel will absorb one-half its volume of lecithin and still retain its dry powdery form.

Lecithin mixed with Irish moss gel forms a light, dry powder which can be readily, uniformly and intimately mixed with either water or oils to form a complete and intimately dispersed emulsion therewith.

The dry mixture of the Irish moss gel and lecithin is mixed with distilled water in sufficient proportions to form a creamy solution into which the food articles may be dipped, or the liquid composition may be sprayed or painted onto the product. It appears that the Irish moss gel acts as a colloidal carrier for the lecithin and distributes the later completely and uniformly throughout the entire solution in microscopic dispersion.

Lecithin itself is difficultly soluble in water or oils, but, when intermixed with the Irish moss gel, it becomes readily soluble therein and appears to have the property of lowering the surface tension of the solution so that it will spread upon the food products to form an impervious liquid coating.

Microscopic examination of the coating indicates the outer surface consists of almost pure lecithin floating on an aqueous cushion of the Irish moss solution.

The lecithin coating has the property of absorbing vast quantities of oxygen and in retaining it so that it cannot contact the food being protected. It also acts to encase or enclose the moisture in the food to prevent dehydration.

The improved coating compound does not change the appearance or flavor of the food product, and, since both the lecithin and the Irish moss have high food value, it actually increases the food value of the product. It is not necessary to remove the coating before using the food.

The preferred mixture is prepared by intermixing substantially 19.5% by weight of lecithin with 2.4% of dry, powdered Irish moss gel to form a light, dry powder. The latter powder is moistened with water to form an aqueous mixture having substantially the consistency of cream. It has been found that approximately 78.1% of the entire aqueous mixture should consist of water. A typical mixture would contain two pounds of water; one ounce of Irish moss; eight ounces of lecithin. The amount of water, however, can be increased without harm to thin the product to facilitate its application.

While preferred forms of the invention have been described in some detail together with the theories which it is believed to best explain its success, it is to be understood that the invention is not limited to the precise procedure described nor is dependent upon the accuracy of the theories which have been advanced. On the contrary, the invention is not to be regarded as limited except in so far as such limitations are included within the terms of the accompanying claims in which it is the intention to claim all novelty inherent in the invention as broadly as is permissible in view of the prior art.

Having thus described the invention, what is claimed and desired secured by Letters Patent is:

1. A method of preserving meat against oxidation and dehydration comprising: coating said food with hydrous mixture of lecithin, and Irish moss gel.

2. A method of preparing a preservative coating for meat to retard oxidation and dehydration of the product comprising: intermixing lecithin with a sufficient dry powdered Irish moss gel to form a light dry powder; adding sufficient water to the latter powder to produce a creamy solution; thence applying said creamy solution over the entire external surface of the food product.

3. A method of preparing an aqueous preservative coating solution for meat to retard oxidation and dehydration of the meat comprising: intermixing 19.5% by weight of lecithin with 2.4% of dry powdered Irish moss gel to form a light dry powder; adding 78.1% of water to the latter dry powder; intermixing the aqueous mixture to the consistency of cream; thence coating the entire external surface of the food product with the creamy aqueous mixture.

WILBER J. ALLINGHAM.

REFERENCES CITED

The following references are of record in the file of this patent:

UNITED STATES PATENTS

| Number | Name | Date |
|--------|------|------|
| 1,553,294 | Baker | Sept. 8, 1925 |
| 1,718,997 | Burt | July 2, 1929 |
| 2,191,352 | Oprean | Feb. 20, 1940 |
| 2,201,064 | Thurman | May 14, 1940 |

FOREIGN PATENTS

| Number | Country | Date |
|--------|---------|------|
| 437,859 | Great Britain | Nov. 6, 1935 |

OTHER REFERENCES

"Confectioner's Journal," August 1933, pages 37 to 41, article entitled "Use of Lecithin in Chocolate Coatings and Icings."